United States Patent [19]

Gault

[11] Patent Number: 4,866,982

[45] Date of Patent: Sep. 19, 1989

[54] ON-BOARD TIRE PRESSURE SENSING SYSTEM

[75] Inventor: Robert L. Gault, Garden City, Mich.

[73] Assignee: Telemagnetics, Inc., Southfield, Mich.

[21] Appl. No.: 234,903

[22] Filed: Aug. 22, 1988

[51] Int. Cl.⁴ .............................................. B60C 23/04
[52] U.S. Cl. ..................................... 73/146.5; 73/745; 338/32 H; 340/448
[58] Field of Search ................. 73/146.5, 146.8, 146.2, 73/146, 745, 746; 340/58; 137/227, 228, 229; 338/32 H

[56] References Cited

U.S. PATENT DOCUMENTS

| | | | |
|---|---|---|---|
| 4,119,944 | 10/1978 | Smith | 73/146.5 |
| 4,597,286 | 7/1986 | Aguglia | 73/146.5 |
| 4,807,468 | 2/1989 | Galan | 73/146.5 |

Primary Examiner—Donald O. Woodiel
Attorney, Agent, or Firm—Rhodes and Boller

[57] ABSTRACT

A tire pressure sensing system for on-board use in an automotive vehicle comprises a transmitter mounted to rotate with each tire and a receiver that is disposed in sensing relationship to each transmitter. Each receiver is a Hall Effect sensor. Each transmitter comprises three magnetic poles that are effective to cause the Hall Effect sensor to develop a bi-directional pulse waveform during passage of the transmitter past the receiver. Electronic circuitry processes the signal waveform that is created by the Hall Effect sensor in response to passage of the magnetic poles. The circuitry develops one rectangular pulse waveform from one magnetic polarity and another rectangular pulse waveform from the other magnetic polarity. The pressure measurement is insensitive to rotational speed of the tire over a certain range of rotational speeds and the acutal pressure measurement is derived by developing a duty cycle waveform in which the duty cycle is a function of the time interval between the leading edge of one of the rectangular pulse waveforms and the leading edge of the other of the rectangular pulse waveforms. The duty cycle waveform is then integrated and filteted to develop the actual pressure measurement signal.

17 Claims, 5 Drawing Sheets

ON-BOARD TIRE PRESSURE SENSING SYSTEM

BACKGROUND AND SUMMARY OF THE INVENTION

This invention relates to a tire pressure sensing system for on-board use in an automotive vehicle such as a car, truck or tractor-trailer to convey inflation pressure information from the rotating pneumatic tires on which the vehicle travels.

It is recognized that the only way to guard against prolonged periods of underinflation of pneumatic tires is by frequently checking pressure and replenishing the tires with air if underinflation is indicated. Visual observation of a tire as an indicator of underinflation is not reliable, especially with contemporary tire designs. The manual checking of each of the four tires on an automobile, and possibly the spare, by means of a strictly mechanical tire pressure gauge is obviously more accurate than visual observation but it involves more than a nominal expenditure of effort. For each tire, the valve cap must be removed, the tire pressure gauge pressed against the exposed valve stem to obtain a reading, the tire filled if the reading indicates too low of pressure, and finally the valve cap must be replaced. It is unrealistic to expect the typical vehicle owner to perform this degree of maintenance on a frequent basis. At best, tire pressure checking is done randomly, if at all.

The owners and operators of commercial rigs and truck fleets are affected on a much larger scale by underinflated tires than are the owners of personal automobiles. In checking a large number of tires on a truck or rig, there will doubtless be many tires which, when checked, are found to be properly inflated, and therefore the time involved in checking these tires is an extra expense to the fleet and rig owners which could have been avoided if it were known beforehand that the pressure was proper.

There are numerous patents that relate to various forms of apparatus for indicating tire pressure without uncapping the valve stem and taking a measurement with a manual tire pressure gauge. Some relate to on-board pressure measurement systems where an occupant of the vehicle is informed if a tire is underinflated. On-board systems are advantageous if they can provide information concerning the present status of the tires, thereby presenting the driver with the opportunity to detect underinflation in its incipiency, and consequently the opportunity for taking corrective action much sooner than might otherwise be the case. Many of these prior schemes are too elaborate, too complicated, or too expensive to be practical. Some give indication only when the pressure drops below a threshold and are incapable of sensing over a range of pressures.

Apart from the obvious safety implications of underinflated tires, it is well documented in the industry that underinflated tires wear at significantly higher rates than properly inflated ones. The economic loss to the public due to premature wear which accompanies underpressurized tires would likely surprise many people.

A commercially acceptable on-board tire pressure sensing system should alert the vehicle operator to an incipient underinflation condition of any tire giving him the opportunity to avoid the above-mentioned problems incidental to underinflation. The deployment of this system also would eliminate the need to manually check the individual tires in the manner described above. For the owners of personal cars and trucks this is a real convenience; for fleet and rig operators, it would afford savings from both the standpoint of reducing premature tire wear and also avoiding the time and expense involved in checking tires which are already properly pressurized.

One of the serious impediments to a successful tire pressure sensing system involves the transmission of the tire pressure information from the rotating tire and wheel. Prior proposals include the use of slip rings, radio frequency transmitters, and magnetic pick-ups. Insofar as the applicant is aware, none of these prior systems has received widespread commercial acceptance, if indeed any at all.

An example of a system that is believed capable of obtaining commercial acceptance is disclosed in the allowed commonly assigned, co-pending application of Louis Galan, Ser. No. 026,953, filed Mar. 17, 1987 and entitled "On-board Tire Pressure Indicating System". According to the disclosure of that patent application, a Hall Effect sensor is disposed on the vehicle adjacent to each rotating wheel on which a pneumatic tire is mounted. On the wheel is a transmitter which comprises three magnets. The magnets are spaced apart in a general circumferential sense on the wheel and lie on essentially the same radius. As the wheel rotates, the magnets repeatedly sweep past the Hall receiver which detects the passage of each magnet. Two of the three magnets are disposed in a predetermined fixed circumferential spacing on the wheel. The third magnet is selectively positioned in a circumferential sense relative to the other two magnets in accordance with the pressure in the tire. Hence, the distance between the two fixed magnets represents a reference measurement dimension, and the distance between the third magnet and one of the two fixed magnets represents an inflation pressure measurement dimension. The Hall sensor detects the passage of the three magnets by a time sequence of three pulses. The time between the two fixed magnet pulses corresponds to the reference measurement dimension while the time between the selectively positioned magnet pulse and one of the two fixed magnet pulses corresponds to the inflation pressure measurement dimension. The ratio of the two measurement dimensions is essentially independent of the rotational speed of the wheel and tire. The actual reference measurement dimension on the wheel is constant, but the sensed reference measurement dimension, in terms of time interval between the two fixed magnet pulses, will vary as a function of the rotational speed of the wheel and tire, specifically being inversely proportional to speed. The actual inflation measurement dimension on the wheel is constant for a given inflation pressure, and in analogous manner to the sensed reference measurement dimension, the sensed inflation measurement dimension as measured by the time between the one fixed magnet pulse, and the selectively positioned magnet pulse will be inversely proportional to rotational speed. The ratio of the sensed reference measurement dimension to the sensed inflation measurement dimension is essentially speed insensitive because velocity factors out when the two sensed measurements are ratioed.

The signals from the Hall sensor are supplied to electronic circuitry which performs the ratio calculation to provide the actual inflation pressure. Different pressures produce different positioning of the positioned magnet whereby the sensed pressure measurement dimension is correlated with pressure so that when the ratio is taken between the sensed reference measurement dimension and the sensed inflation pressure measurement dimension, the true inflation pressure measurement is attained. The inclusion of the Hall Effect sensor in combination with this three magnet system produces a very accurate and reliable means for transmitting the pressure information from the rotating wheel and tire to the electronics. The electronics can then operate an appropriate display or displays on the vehicle instrument panel for indicating the tire pressure status. Advantageously the system is capable of providing a numerical readout of the actual pressure and/or operating warning lights to indicate when a predetermined low pressure has been reached. The particular type of readout that is used in any given system is of course one of choice.

The present invention in certain respects relates to an improvement upon the system that is disclosed in allowed application Ser. No. 026,953. One aspect of the improvement resides in the ability of the system to perform the pressure sensing function with a fewer number of magnets. Specifically, there will be disclosed two embodiments of the present invention, one using only two magnets in the transmitter and the other using a single magnet and a keeper in the transmitter. A Hall Effect sensor continues to be employed as the receiver of information from the transmitter as the transmitter rotates past the receiver.

Another aspect of the invention relates to the manner in which the various component parts, particularly the magnet parts, are organized and arranged in the transmitter. This organization and arrangement produces particular magnetic pulse transmissions that are received by the Hall sensor as the transmitter rotates past. The Hall sensor is in turn connected with electronic circuitry that processes the signals to develop tire pressure information.

The electronics that is associated with the Hall sensor represents a still further aspect of the invention. The electronics comprises a unique organization and arrangement of conventionally recognized electronic circuits such as comparators, signal conditioners, phase detectors, flip-flops, etc. More specifically, the unique configuration of magnetic parts in the transmitter results in the creation of a bi-directional pulse waveform in the Hall sensor during each revolution. This bi-directional pulse waveform contains the sensed tire pressure information in a particular format and the electronics associated with the Hall sensor process the waveform in a manner which extracts the tire pressure information to produce an output signal that can drive a display device such as an indicator light and/or a meter. The meter of course could be either analogue or digital. In this way, useful tire pressure information is presented to the operator of the vehicle while the vehicle is in motion.

The foregoing features, advantages, and benefits of the invention, along with additional ones, will be seen in the ensuing description and claims which should be considered in conjunction with the accompanying drawings. The drawings disclose a presently preferred embodiment of the invention according to the best mode contemplated at the present time in carrying out the invention.

DESCRIPTION OF THE PREFERRED EMBODIMENT

Figure 1:
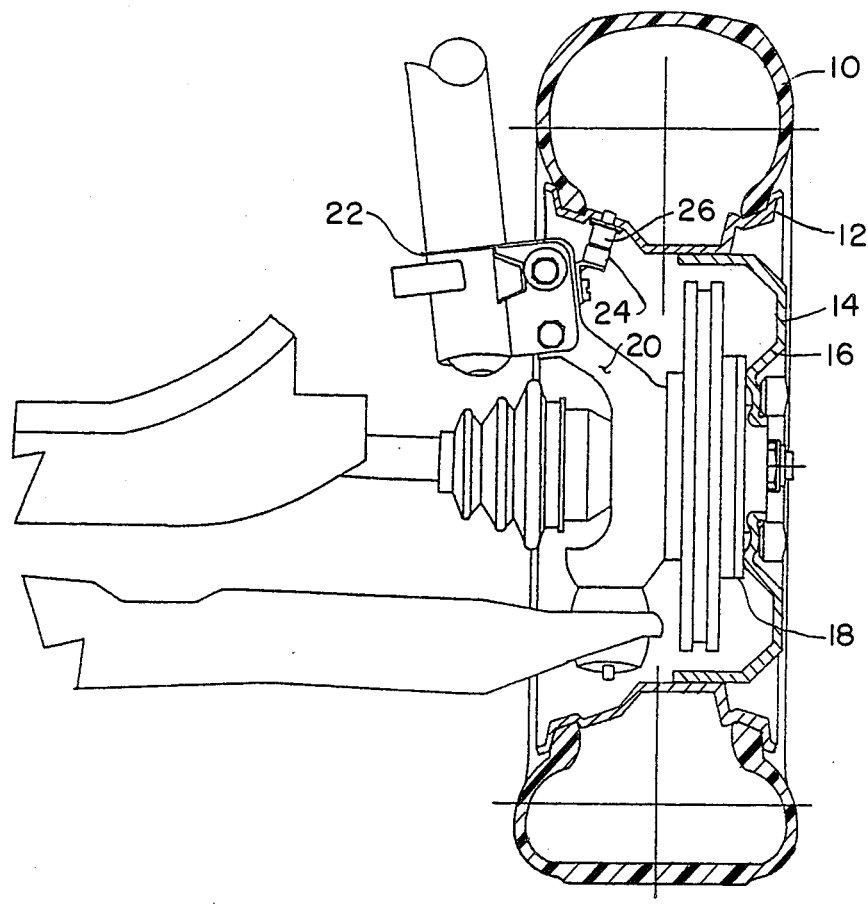
FIG. 1 is a vertical cross sectional view through an automobile tire illustrating a mounting of the tire pressure transmitter and receiver.

FIG. 1 illustrates a tubeless type pneumatic tire 10 mounted on the outer circular rim 12 which is one part of a two piece wheel assembly 14 whose second part is the spider 16 which is attached to the wheel hub 18.

FIG. 1 illustrates one of the two front wheels of a front wheel drive type vehicle. Since the front wheels are steered, each contains a steering knuckle 20, the upper portion of which is attached a suspension mechanism 22 of the vehicle. Mounted on the knuckle adjacent the point of mounting of the suspension system 22 is a receiver 24 that forms a part of the tire pressure sensing system of the present invention. This part does not rotate with the wheel and tire.

Mounted on the rotating wheel and tire is a transmitter 26. The transmitter 26 is disposed to revolve with the wheel essentially along a circular path concentric with the wheel axis. As such, the transmitter rotates past the receiver during each revolution of the wheel. At its passage across the receiver, the transmitter confronts the receiver in fairly close relationship. As the transmitter passes the receiver, a signal waveform is induced in the receiver and it is this waveform that is processed by the electronics to extract the tire pressure information.

Receiver 24 is a Hall Effect sensor. Transmitter 26 is a device containing magnetic elements that is adapted to act upon the Hall Effect sensor during passage of the transmitter past the sensor. A semi-schematic form of the transmitter is shown in FIG. 2.

Transmitter 26 comprises a body 28 that may be considered to have a longitudinal axis 30. The longitudinal axis 30 is arranged on the wheel so as to be tangent to the direction of rotation of the wheel. Disposed on body 28 adjacent one end thereof is a fixed magnet 32. Magnet 32 has a circular cylindrical shape comprising a north pole and a south pole at opposite axial ends. The axis of the magnet is arranged transverse to axis 30 so that the face of the south pole confronts the Hall Effect sensor during passage of the transmitter across the Hall sensor.

Body 28 comprises a circular internal bore 34 that is arranged coaxially with axis 30. A movable magnet 36 is disposed within bore 34, and although not shown in FIG. 2, the cylindrically shaped sidewall of the magnet is suitably sealed with respect to the wall of bore 34. One side of the magnet is exposed to the pressure existing within the pneumatic tire on which the transmitter is mounted. For this purpose the bore 34 is shown extending to a port 38 which passes through, and is sealed with respect to, a hole that is provided in the rim of the wheel. In this way the internal tire pressure is transmitted through port 38 to act on the axial end face of magnet 36 that is toward magnet 32, and the magnet is arranged so that this face is a south pole. The opposite north pole face of magnet 36 is not exposed to the tire pressure but rather is exposed to atmospheric pressure such as through a suitable bleed hole 40 for example. A suitable compression spring 42 is disposed within bore 34 to act between the endwall of the bore and the axial end face of magnet 36 which contains the north pole. The spring exerts a bias force urging magnet 36 to the left in FIG. 2 while the pressure that is communicated by port 38 to the opposite side of magnet 36 acts to urge the magnet toward the right against the force of spring 42. With this organization and arrangement the magnet will assume an axial position along the length of bore 34 where the spring force and the force due to tire inflation pressure are in balance. In other words, increasing tire pressure will push magnet 36 increasingly to the right against the increasing resistance of spring 42 to a position where the forces are in balance, while a decreasing pressure will result in spring 42 pushing the magnet to the left to a position where the forces are in balance. Thus, the position of magnet 36 within bore 34 is an indication of the tire inflation pressure.

Figure 2:
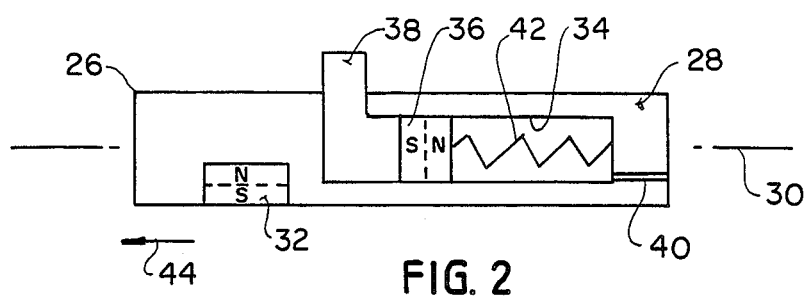
FIG. 2 is an enlarged semi-schematic view taken longitudinally through the tire pressure transmitter.

The forward direction of rotation of the wheel and tire relative to the Hall sensor is indicated by the arrow 44 in FIG. 2. Thus, as the transmitter moves past the Hall sensor, magnet 32 first acts upon the Hall sensor followed by magnet 36. The body of the sensor is constructed of a material, such as a suitable plastic, that does not influence the magnetic flux patterns of the magnets themselves. Hence, the magnetic flux patterns from the respective magnets are free to act upon the Hall sensor in accordance with how the magnets are positioned on the body of the transmitter.

As magnet 32 acts upon the Hall sensor, it is the south pole of magnet 32 that has an effect, not its north pole. At this point it should be mentioned that the Hall sensor is biased to a nominal voltage level and produces a nominal output voltage signal level in the absence of any magnetic influences acting upon it. When a particular polarity of magnetic flux begins to act on the Hall device, the output signal swings in one direction while an opposite polarity of magnetic flux acting on the device causes the output signal to swing in the opposite direction. Therefore, as magnet 32 begins to move past the Hall device, the Hall output swings in a direction indicative of a south pole type magnetic flux. However, because the moveable magnet 36 is arranged so that both south and north magnetic flux can influence the Hall sensor as it moves past, the Hall sensor output will have a bi-directional characteristic output as the magnet 36 moves past. The manner in which this occurs can perhaps best be seen by the first waveform in FIG. 4.

C represents the nominal output of the Hall sensor that exists when it is free of any magnetic influence. As the south pole of magnet 32 begins to sweep past the Hall sensor, the output signal begins to drop as indicated by the segment 46 of the waveform. At the point of maximum south pole flux acting upon the Hall sensor, the signal has dropped to the point indicated by the reference numeral 48. As the transmitter continues moving past the receiver, magnet 32 now begins to have less influence on the Hall sensor and the signal output of the Hall sensor begins to rise. This is represented by the segment 50. However, the rise in the waveform is limited because of the effect of the south pole of magnet 36 which, begins to come into play as the transmitter continues to rotate past the Hall sensor. Hence, the waveform is driven back down along the segment 52 to reach a low point when the south magnetic pole of magnet 36 is exerting maximum influence. Thereafter, the Hall output begins to rise along the segment 54 and will continue to do so until it returns to the reference level C. At this point the transmitter will have moved to a position where the north pole of magnet 36 begins to have influence with the result that the Hall output will now rise higher than the C level. This is represented by the segment 56. At the maximum north pole flux, the waveform rises to the point indicated by the numeral 58 and thereafter as the transmitter concludes its passage past the Hall sensor, the Hall output signal drops along the segment 60 returning to the C level. Since a typical transmitter is perhaps an inch or somewhat longer, its overall length is small in comparison to the distance that it travels in one revolution with the wheel. Hence, the duration of the bi-directional pulse waveform that has just been described is comparably small in relation to the period between successive pulses. The bi-directional pulses contain information about the tire inflation pressure and the manner in which that information is extracted by the electronics will now be explained.

Figure 4:
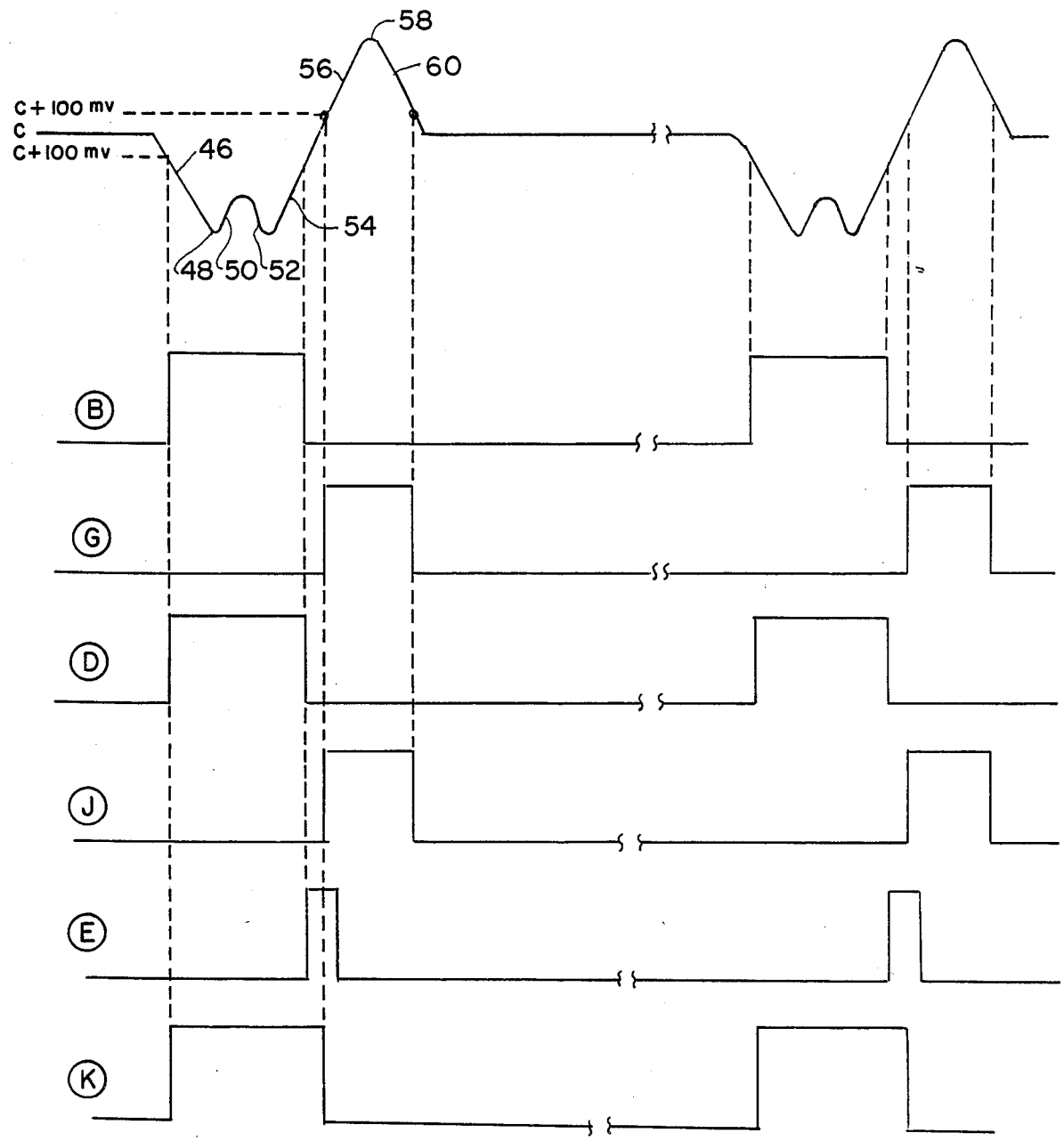
FIG. 4 is a series of waveforms taken at different points in the schematic diagram of FIG. 3 on a common time scale.

Let it be assumed that the waveform shown as the first waveform in FIG. 4 represents a nominal inflation pressure, say 30 PSI for a typical automobile tire. How this information is processed by the circuitry of FIG. 3 will now be explained with reference to both FIGS. 3 and 4. The waveform output of the Hall Effect sensor is supplied to both a comparator U2A and a comparator U2B. The two comparators however are configured so that U2A responds to the south pole pulse while U2B responds to the north pole pulse. U2A is set to switch at C−100 MV, and U2B is set to switch at C+100 MV. Accordingly, the second output waveform shown in FIG. 4 identified by the letter B is the waveform that appears at the output of comparator U2A. Similarly the third waveform of FIG. 4, designated by the letter G is the output of comparator U2B.

Two signal conditioner circuits associated with each comparator U2A, U2B are for the purpose of enhancing the rise and fall times of the signals B and G. Thus the output waveform D from the two signal conditioners U3A, U3B associated with comparator U2A corresponds to the waveform B but with sharper rise and fall times, preferably 5 microseconds or less. Likewise, the waveform J which is the fifth waveform in FIG. 4 corresponds to waveform G but conditioned by the signal conditioners U3C and U3D to produce faster rise and fall times.

Waveform D is supplied to a edge detector circuit U7A. The edge detector circuit is essentially a monostable multi-vibrator (one shot) that produces a fixed duration pulse output in response to occurrence of the trailing edge of the D waveform. This output pulse is designated by the waveform E and appears as the sixth waveform in FIG. 4. The E waveform and the J waveform are supplied to respective inputs of an And Gate U5A. The And Gate output is in turn connected to the set input of a flip-flop U6A, U6B. The J signal is also supplied as an input to an RPM switch U4, and the output of RPM switch U4 is supplied to the reset input of flip-flop U6A, U6B. As will become more apparent from the ensuing description, the organization and arrangement of circuits U7A, U4, U5A, U6A, U6B provide a certain blanking function for blanking the displays at low vehicle speeds.

Figure 3:
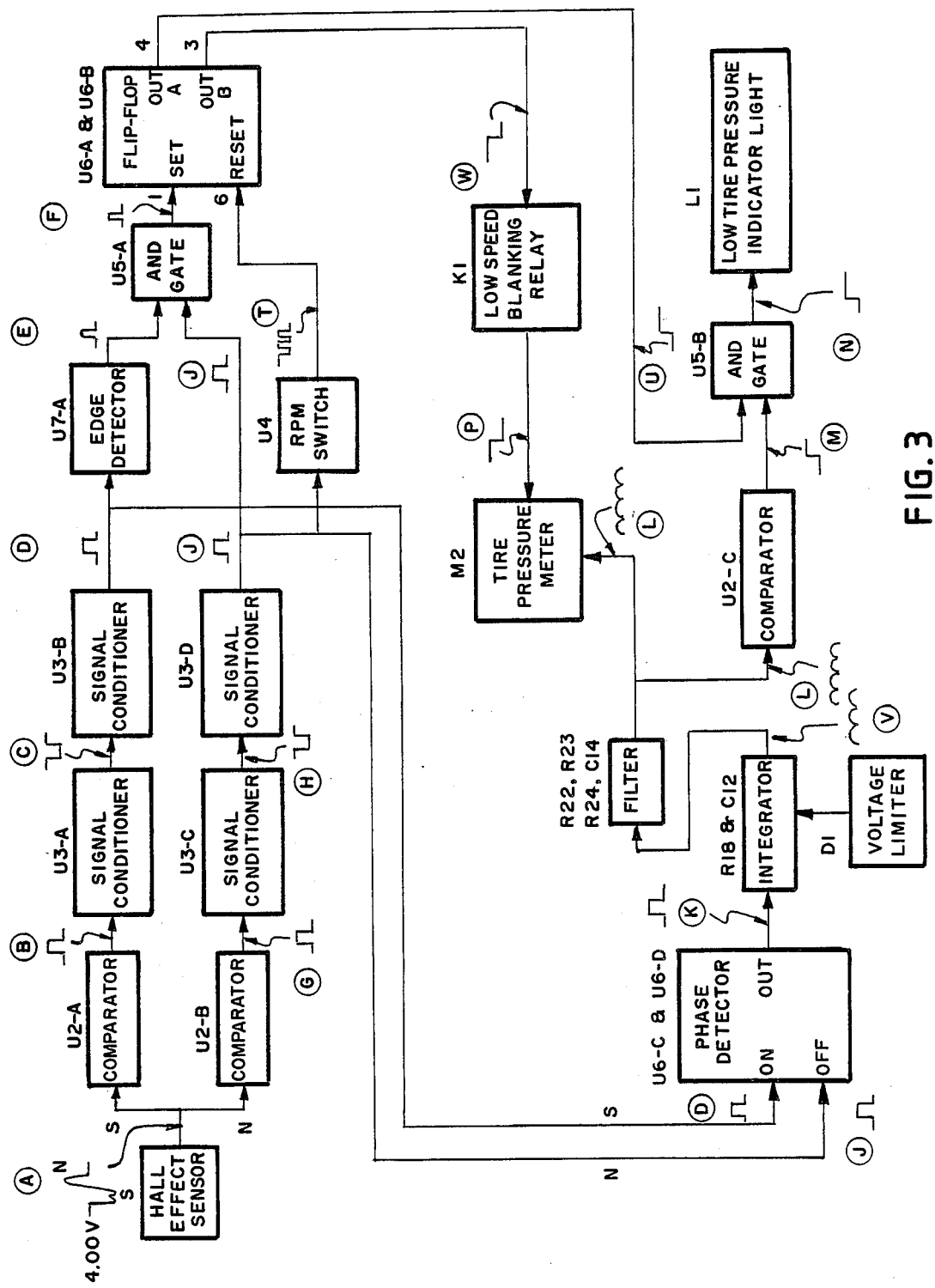
FIG. 3 is a schematic block diagram illustrating the Hall Effect sensor receiver and the associated electronics which processes the signal waveform output of the Hall Effect sensor to generate the tire pressure measurement signal.

The D and J waveforms are supplied to respective inputs of a phase detector U6C, U6D. The phase detector is essentially a flip-flop that is set by the leading edge of the D pulse and reset by the leading edge of the J pulse. In FIG. 3 the output waveform of the phase detector U6C, U6D is designated by the letter K, and the same K waveform appears as the last waveform in FIG. 4. It is the duty cycle of this waveform K which represents the tire inflation pressure.

FIG. 3 shows how this information from waveform K is processed by means of an integrator R18–C12 and in turn filtered by R22, R23, R24, C14 to drive a tire pressure meter M2. The tire pressure meter provides a numerical display, either analog or digital, of the inflation pressure. A blanking relay K1 that is coupled to the reset output of flip-flop U6A, U6B is used to blank the meter at low vehicle speeds. In other words, the meter is allowed to display tire pressure only when the vehicle is traveling above a certain threshold, as will be more fully explained later on.

Another portion of the display comprises a low tire pressure indicator light L1. This is operated by taking the signal from filter R22, R23, R24, C14 and comparing it to a predetermined low pressure reference level in a comparator U2C. This comparator output is coupled to one input of an And Gate U5B. The And Gate output connects to the indicator L1. The second input of the And Gate is from output A of flip-flop U6A, U6B so that the low tire pressure indicator light is allowed to operate only when the vehicle speed exceeds the low speed threshold, as will be explained later on in more detail. Flip-flop U6A, U6B is a reset-dominant device whose output A line is normally low and whose output B line is normally high prior to the first set input pulse.

Figure 5:
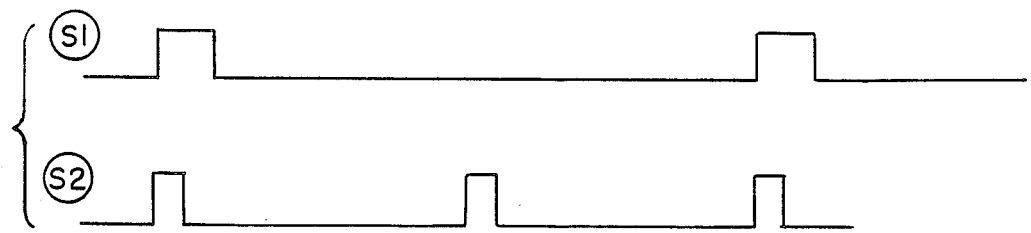
FIG. 5 is a series of two waveforms illustrating how the system in insensitive to different wheel speeds.

FIG. 5 shows how the circuit is insensitive to wheel speed. The first waveform S1 shows a speed that is essentially one-half the speed represented by the second waveform S2. Although the period of the first waveform S1 is twice as long, each pulse is twice the width of the corresponding pulse of the second waveform S2. The key point is that the average values, or duty cycles, of both waveforms are identical, and therefore when integrated and filtered, will produce the same reading on the meter M2.

Figure 6:
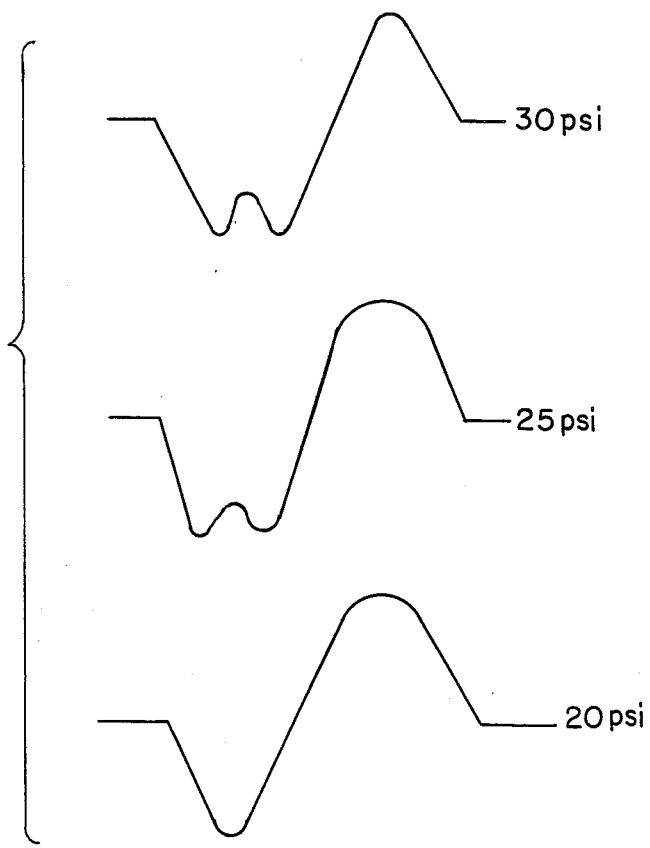
FIG. 6 is a series of three waveforms illustrating the effect of different sensed tire pressures on the Hall Effect sensor output waveform.

The waveforms of FIG. 6 show the effect of change with changing tire pressure. The first waveform is the shape portrayed by the first waveform of FIG. 4 which would be for a nominal tire pressure, 30 psi for example. If the pressure decreases, the waveform assumes a shape similar to that shown by the second waveform; for example, this could represent a 25 psi tire pressure. A still further decrease in pressure, say to 20 psi for example, results in a waveform that like shown by the third waveform.

Thus, as the tire pressure decreases, the time between the leading edge of the D pulse and the leading edge of the J pulse progressively decreases. This results in a corresponding decrease in the widths of the pulses of the K waveform and hence, a reduction in the duty cycle of the K waveform which in turn leads to a correspondingly reduced reading on meter M2. The low tire pressure indicator light turns on whenever the sensed pressure falls below the preselected threshold. For example, if the threshold were set at 25 psi the light would remain off for pressures above 25 psi but would come on when the pressure falls below 25 psi, provided of course that the speed of the tire exceeds the low speed threshold. It can be seen from the waveforms of FIG. 4 that forward rotation of the wheel produces the pulses of waveforms B, J, and E in the sequence B, E, J. When the wheel rotates in reverse, the sequence is J, B, E in which case the E pulse never overlaps the leading edge of the J pulse and both the meter and the indicator light are prevented from being operated because flip-flop U6A, U6B cannot be set at any reverse speed even if that speed is above the low speed threshold.

The manner in which the meter M2 and low pressure indicator light L1 are blanked at low vehicle speeds will now be explained. In FIG. 4 it can be seen that the pulse of the E waveform overlaps the leading edge of the pulse of the J waveform. The pulse width of the pulse of the E waveform is selected so that this will hold true for all speeds above a certain minimum, 10 miles per hour for example. Consequently, both inputs to And Gate U5A will be high so that flip-flop U6A, U6B is continuously set so long as the speed continues above 10 mph. This in turn prevents the blanking relay K1 from disabling And Gate U5B and meter M2 until such time as the speed falls below the low speed threshold.

When the speed drops below 10 miles per hour the E pulse no longer overlaps the leading edge of the J pulse and therefore flip-flop U6A, U6B is in a condition where it can be reset by RPM switch U4. Such resetting by RPM switch U4 does not occur however, until the speed drops below a lesser speed than 10 miles per hour, say 8 miles per hour. Hence the RPM switch is set to switch at 8 miles per hour. The effect then is to set a low cut-off threshold for both the tire pressure meter M2 and the low tire pressure indicator L1 with said threshold having a hysteresis characteristic. In other words, when the wheel speed accelerates from below 8 miles per hour to a speed greater than 10 miles per hour, the tire pressure meter M2 and the low pressure indicator light L1 cannot provide indications until the speed rises above 10 miles per hour; and when the speed decreases from above 10 miles per hour to below 8 miles per hour both the meter and the indicator light can continue to give indications until such time as the speed falls below 8 miles per hour. The reason for low speed blanking is because it takes a certain amount of time for the integrator capacitor C12 to stabilize as the vehicle accelerates from standstill or from low speeds. The voltage limiter D1 that is in association with the integrator limits the integrator voltage when the wheel is driven in reverse.

Figure 7:
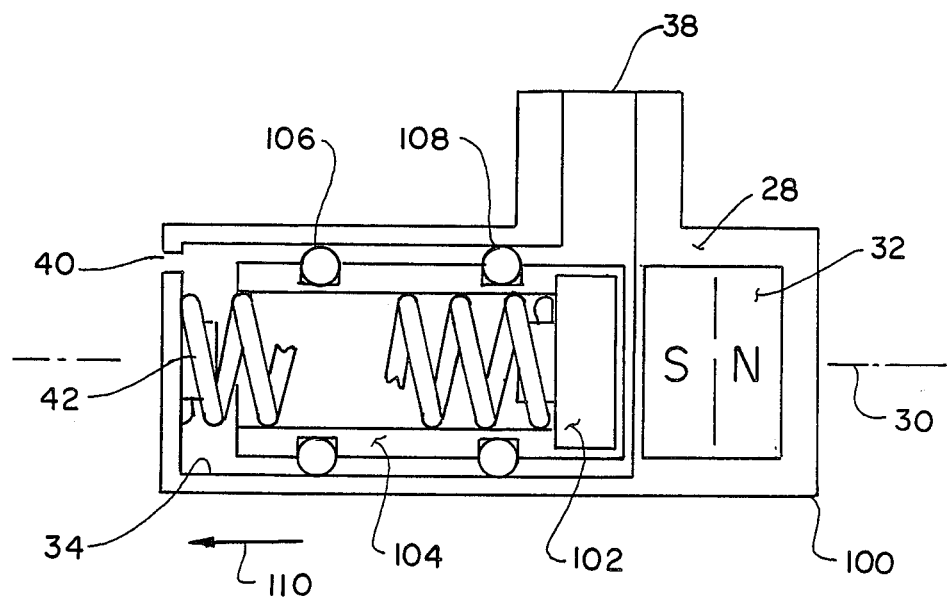
FIG. 7 is a view similar to FIG. 2 of an alternate embodiment of transmitter.

FIG. 7 shows an alternate embodiment of transmitter 100. Like the first transmitter of FIG. 2, transmitter 100 has a body 28 having a longitudinal axis SO, a fixed magnet 32, a circular internal bore 34 that is arranged coaxially with axis 30, a port 38 that communicates bore 34 to the internal tire pressure, a bleed hole 40 and a compression spring 42. The moveable magnet of the first embodiment is replaced by a keeper 102 in the form of a circular cylindrical disk arranged as shown. The disk is housed at one end of a circular cylindrical plunger 104, and the plunger sidewall is sealed with respect to the wall of bore 34 by means of a pair of axially spaced apart o-ring seals 106, 108. Spring 42 urges plunger 104, and hence keeper 102, to the right as viewed in FIG. 7 while the pressure from the tire will act to urge the plunger and keeper toward the left as viewed in FIG. 7. It can be appreciated then that the axially position that is assumed by the keeper will be a function of the pressure sensed at port 38, the keeper being displaced further away from the fixed magnet 32 as the pressure increases. It is also to be observed that magnet 32 is arranged to have its axis coaxial with axis 30 and not transverse to axis 30 as in the first embodiment. The plunger is of a material that does not interfere with the magnetic flux.

The arrow 110 in FIG. 7 illustrates the direction in which the transmitter 100 rotates forwardly past the Hall Effect sensor. The sequence is such that first the keeper 102 rotates past the Hall sensor, then the south pole of magnet 32, and finally the north pole of magnet 32. This organization and arrangement is effective to cause the Hall sensor to generate waveforms that are generally similar to those previously described for the first transmitter. The reason for this is that keeper 102 has a high magnetic permeability, and therefore when it is disposed in confrontation of the south pole of magnet 32 as it is in transmitter 100, a south pole tends to be created in the keeper itself. Hence, the sequence of rotation of the three magnetic poles past the Hall sensor will be similar for both embodiments of transmitters, namely south, south, north.

While the system that has been described is for monitoring one wheel, it is to be appreciated that in an automotive vehicle that has four wheels there would be a comparable arrangement for each wheel so that the pressure in each tire can be sensed.

While a preferred embodiment of the invention has been disclosed, it will be appreciated that principles will be applicable to other embodiments.

What is claimed is:

1. A system for providing inflation pressure information from a rotating pneumatic tire comprising three magnetic poles that rotate with the tire, the first of which poles is of one polarity and the second and third of which poles are of the other polarity, means for moving the first and second poles in unison with each other relative to the third pole in accordance with the inflation pressure existing within the pneumatic tire, and sensor means which does not rotate with the tire and which is disposed in sensing relationship to the three magnetic poles as they rotate past the sensor means, said sensor means comprising means to develop from said three magnetic poles a signal waveform that contains information about the inflation pressure of the pneumatic tire irrespective of the particular speed at which the tire is rotating over a given range of rotational speeds for the tire, said signal waveform comprising bi-directional pulses derived from each passage of said three magnetic poles past the sensor means, each bi-directional pulse containing the inflation pressure information.

2. A system as set forth in claim 1 in which said sensor means comprises a Hall Effect sensor that is disposed in sensing relationship to the three magnetic poles and that has an output that is coupled to electronic circuitry for processing the signal waveform developed by the Hall Effect sensor from the passage of the three magnetic poles past the Hall Effect sensor.

3. A system as set forth in claim 1 in which said first and second magnetic poles are provided by a single magnet and the third pole is provided by a single pole of a second magnet.

4. A system as set forth in claim 3 in which said magnets are part of a transmitter that rotates with the pneumatic tire, said transmitter comprising a body having a bore that is arranged generally tangent to the direction of rotation and said first magnet is disposed for movement within said bore in accordance with the sensed pneumatic tire pressure and the second magnet is disposed in a fixed position on the body of the transmitter.

5. A system as set forth in claim 4 in which the first magnet has a circular cylindrical shape that is coaxial with the bore and moveable within the bore and the second magnet has a circular cylindrical shape whose axis is arranged transverse to the axis of said bore.

6. A system as set forth in claim 1 in which said first and second magnetic poles comprise a single magnet and the third magnetic pole comprises a keeper that is under the influence of one of the poles of said single magnet.

7. A system as set forth in claim 6 in which the single magnet and said keeper are part of a transmitter assembly that rotates with the rotating pneumatic tire, said transmitter comprising a body, said keeper being moveable on said body and said single magnet being fixedly mounted on said body.

8. A system as set forth in claim 7 in which said body has a circular cylindrical bore whose axis is generally tangent to the direction of rotation of the tire, said keeper having a circular cylindrical shape for coaxial movement within said bore, and said single magnet is fixedly mounted on said body coaxial with the axis of said bore.

9. A system as set forth in claim 1 in which said sensor means comprises a receiver that is responsive to passage of the three magnetic poles past the receiver to create the signal waveform and including electronic circuitry that is connected to said receiver to process the signal waveform.

10. A system as set forth in claim 9 in which said electronic circuitry comprises means to create two rectangular pulse waveforms, one derived from one polarity of magnetic pole and the other derived from the other polarity of magnetic pole, and in which the pressure measurement is defined by the distance from the leading edge of a pulse of one of said two rectangular waveforms to the leading edge of a corresponding pulse of the other of the two rectangular waveforms.

11. A system for providing inflation pressure information from a rotating pneumatic tire comprising plural magnetic poles that rotate with the tire, means for moving one of said poles relative to another of said poles in accordance with the inflation pressure existing within the pneumatic tire, and sensor means which does not rotate with the tire and which is disposed in sensing relationship to said magnetic poles as they rotate past the sensor means, said sensor means comprising means to develop from said magnetic poles a signal waveform that contains information about the inflation pressure of the pneumatic tire irrespective of the particular speed at which the tire is rotating over a given range of rotational speeds for the tire, said signal waveform comprising bi-directional pulses derived from each passage of said magnetic poles past the sensor means, each bi-directional pulse containing the inflation pressure information, and including electronic circuitry that is connected to said receiver to process the signal waveform, said electronic circuitry comprises means to create two rectangular pulse waveforms derived from said bi-directional pulses, and in which the tire inflation pressure information is defined by the distance from the one edge of a pulse of one of said two rectangular waveforms to one edge of a corresponding pulse of the other of the two rectangular waveforms.

12. A system as set forth in claim 11 in which tire inflation pressure information is defined by the distance from the leading edge of a pulse of said one rectangular waveform to the leading edge of a corresponding pulse of said other rectangular waveform.

13. A transmitter for mounting on a rotating pneumatic tire to transmit inflation pressure information from the tire to a receiver disposed adjacent the tire, said transmitter comprising a body having a bore containing a circular cylindrical disk magnet whose axis is arranged tangentially relative to the rotating tire so that both poles can act upon the receiver and which is positioned within the bore on the body in accordance with the inflation pressure in the tire, and a second magnet arranged in a fixed location on said body with its axis transverse to that of the first magnet so that only one pole of the second magnet can act on the receiver.

14. A transmitter as set forth in claim 13 in which the one pole of the second magnet is of the same polarity as the pole of the first magnet which is nearer the second magnet.

15. A transmitter as set forth in claim 13 in which said second magnet is a circular cylindrical disk.

16. A transmitter for mounting on a rotating pneumatic a receiver disposed adjacent the tire, said transmitter comprising a body having a bore containing a moveable element that is positioned within the bore in accordance with the inflation pressure in the tire, said bore being tangent to the direction of rotation, and a second element that is fixedly mounted on said body in axial alignment with said bore one of said elements being a magnet having its axis in axial alignment with said bore, and the other of said elements being a keeper which is disposed in the magnet flux pattern of said magnet so that the keeper is polarized to the same polarity as the nearer pole of the magnet.

17. A transmitter as set forth in claim 16 in which the keeper is the first element and the magnet is the second element.

* * * * *